June 28, 1960
G. A. DYER ET AL
2,942,783
THERMOSTATICALLY STABILIZED SYSTEM
Filed July 1, 1957
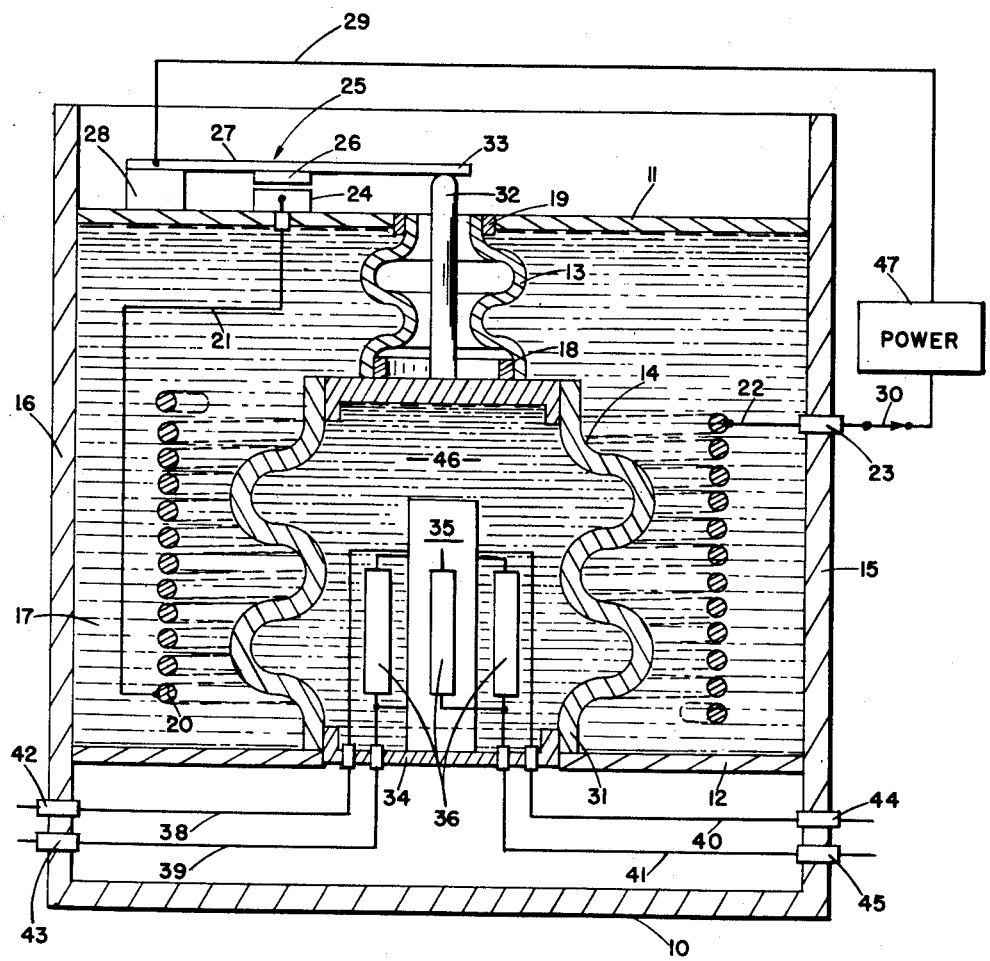
INVENTORS.
HAROLD G. MARKEY
GEORGE A. DYER
BY
*Allan Rothenberg*
ATTORNEY United States Patent Office 2,942,783
Patented June 28, 1960

2,942,783

THERMOSTATICALLY STABILIZED SYSTEM

George A. Dyer, La Mirada, and Harold G. Markey, San Jose, Calif., assignors to North American Aviation, Inc.

Filed July 1, 1957, Ser. No. 669,213

1 Claim. (Cl. 236—1)

This invention relates to a temperature stabilizing system and more particularly to apparatus for effecting a uniform precision temperature control.

The increasingly rigid requirements for reliability, stability and precision of automatic control equipment has necessitated the use of high stability components, elements, and subsystems of greatly increased precision. The desired characteristics of such devices are often temperature dependent. Such devices will frequently exhibit an exponential change of operating characteristics with temperature changes. For example, a change of one degree centigrade in temperature of the crystal (i.e., semi-conductor) diodes of a suppressed carrier modulator may introduce into a system of which they form a part, significant errors of a magnitude which cannot be tolerated. Further, a slight temperature differential between the diodes of such a modulator is also detrimental.

A temperature stabilization has been achieved heretofore by the location of the device to be temperature stabilized adjacent to a temperature sensing device such as a thermocouple, bimetal element, gas filled bellows or the like and providing some means external to the temperature sensing device for transmission of heat from the apparatus to be stabilized to the sensing element. Such systems are inherently subject to a lagging response due to the necessary interposition of some heat transfer medium between the temperature sensor and the apparatus to be temperature stabilized. Further, such systems render more difficult and inaccurate the uniform sensing of the temperature of all portions of the stabilized device. Additionally, conventional heat sensing systems are lacking in the required precision sensitivity, particularly when the temperature of different elements or different parts of an apparatus must be uniformly sensed and controlled.

The most sensitive region of any thermostatically stabilized system is actually the material or substance thereof that recognizes a temperature change. In accordance with the present invention the apparatus to be temperature stabilized is actually located with its entire external surface area in intimate contact with the temperature sensitive medium which recognizes a temperature change. The recognition of temperature change is effected by fluid particularly chosen for stabilization at a predetermined temperature. The specific fluid is selected to provide an output signal in response to a temperature change which occurs substantially at the temperature at which a portion of the fluid undergoes a change of state. More particularly, the system is so arranged that a portion of the temperature sensing medium will have one state, such as liquid, below a predetermined temperature and another state, such as vapor, above such temperature. The sensing medium is expansibly confined so that the sensed temperature change at the change of state temperature is manifested as a signal in the form of a significantly large volume change and thus a large pressure change which effects expansion of the chamber confining the sensing fluid. It is to be noted that the volume change produced by the change of state of a confined fluid at its vapor point or boiling point is significantly greater than the volume change due to the mere expansion of a gas confined in a conventional bellows. This volume change which occurs at the change of state of a confined fluid is due to the increased rate of vaporization at the boiling point and yields a greater pressure increase in a closed system than the pressure increase due to a comparable temperature change which does not effect a change of state. The apparatus to be temperature stabilized is mounted entirely immersed within the change of state fluid whereby all portions of the apparatus are maintained at the temperature of the fluid. A heater is mounted adjacent to, but externally of, the confined fluid to raise the temperature thereof to its boiling point, whereby there is produced a mechanical motion signal as the chamber expands. This mechanical motion is used to shut off the heater which will be again energized when the temperature of the confined fluid drops below its boiling point and allows the chamber to contract. Therefore, uniformity of temperature of the sensing fluid within relatively small limits is not dependent upon any lagging elements between the apparatus to be stabilized and the sensing medium itself.

It is an object of this invention to provide an improved thermostatically stabilized system.

Another object is the provision of improved temperature sensing apparatus.

A further object of this invention is to provide a mechanism for sensing temperature directly without the need for any medium external to the sensing mechanism for transmitting heat from the temperature stabilized device to the sensing mechanism.

Still another object of this invention is the provision of a thermostatically stabilized system in which the apparatus to be temperature stabilized is entirely immersed in a temperature sensing medium.

A further object of this invention is the provision of a thermostatically stabilized system in which temperature variation is manifested as a change of state of the sensing medium.

These and other objects of the invention will become apparent from the following description taken in connection with the accompanying drawing in which the single figure illustrates a thermostatically stabilized system constructed in accordance with the principles of this invention.

As illustrated in the drawing, a casing 10 in the form of a hollow container which may be either open to the atmosphere or sealed to provide a predetermined pressure has secured to the interior of the walls thereof a pair of supports 11, 12, which together with a flexible boot 13, a sealed bellows 14 and the walls 15, 16, of the casing 10 provide an external chamber which is filled with a heat conductive fluid such as silicone oil 17. The silicone oil inherently improves the operation of the apparatus in several ways. First, the oil operates to uniformly apply the heat of coil 20 to the exterior of the bellows 14. Additionally, due to its relatively large mass, the oil 17 acts to some extent to decrease the transfer to the bellows of temperature changes external to chamber walls 16. The boot 13 is suitably sealed at its respective ends to the top surface of the bellows 14 and to the periphery of an aperture in the support member 11 by liquid sealing rings 18, 19 or cement, solder or the like. An electric heating coil 20 is mounted in the oil 17 adjacent the bellows 14 and may be supported by any convenient means such as the electric leads 21, 22 which supply power to the heater. Lead 22 is connected to a heater power terminal 23 extending through casing wall 15 while lead 21 is coupled to a contact 24 of a switch 25 mounted on support 11 and having a movable contact 26 electrically connected by means of a spring arm 27, spring arm support 28 and lead 29 to a heater power source 47. Terminal 23 is coupled with the power source by a manual control such as switch 30.

It is to be understood that elements 24, 27 and 28 are suitably electrically insulated from each other as, for example, by forming support 11 or 28 of non-conductive material. The bellows 14 which is preferably formed of a heat conductive material such as a resilient metal has the lower end 31 thereof sealed to the periphery of an aperture in the lower support 12. A switch operator 32 which may be of dielectric material is secured to the upper portion of the bellows and has the upper end thereof operatively engaging an extension 33 of the spring arm 27. A circular plug 34 has secured thereto a component support illustrated in the form of an upstanding lug 35 which extends into the interior of the bellows 14. The disk or plug 34 may be a press fit in the aperture of support 12 or may be otherwise sealingly engaged therewith and with the lower end of the bellows in order to provide a vapor tight seal thereof. The bellows 14 is filled with a suitable fluid 46 which exhibits a change of state substantially at the chosen stabilization temperature. For stabilization at a particular temperature within the 60 to 80 degrees centigrade range, for example, fluids such as alcohol, acetone or carbon tetrachloride may be chosen, the particular choice of fluid being determined by the predetermined boiling point thereof which is the stabilization temperature of the system.

The apparatus to be stabilized, herein illustrated as a plurality of crystal diodes 36, is secured to the component support 35 and has the electrical leads 38, 39, 40, and 41 thereof extending through the sealing plug 34 to electrical terminals 42, 43, 44 and 45 which are mounted in the walls of casing 10. Thus, it will be seen that the apparatus to be temperature stabilized, the semi-conductor diodes 36, is totally immersed within the change of state fluid 46 and has the entire external peripheral surface thereof in intimate contact with the fluid.

In operation, the heater 20 which surrounds the bellows 14 is energized through switches 25 and 30 with an electric current from power source 47 when the temperature of the fluid 46 is below the boiling point thereof and the bellows 14 is in a relatively contracted position which allows contact between switch elements 24 and 26. Heat generated by heater coil 20 is uniformly conducted by the silicone oil 17 to the metallic bellows 14 from whence it is in turn conducted to the fluid 46 within the bellows. When the boiling point or vapor point of the fluid 46 is reached, the rate of vaporization of the fluid increases, increasing the vapor pressure of the confined fluid to expand the bellows 14 and open switch 25. This action causes current to cease flowing in the heater coil and thus stops transfer of heat to the bellows and the fluid therein. When the temperature of the change of state fluid decreases, its vapor pressure drops, the bellows contracts, the switch is closed and the heater is again activated. This continuous action occurs at the well defined temperature of the change in state of the fluid and thus maintains a highly precise control of the temperature thereof. The apparatus to be stabilized, the diodes 36, is carried entirely within the fluid 46 and thus is operated at the exact internal temperature of the fluid irrespective of external temperature fluctuations. It will be readily appreciated that the location of the apparatus to be stabilized in total intimate contact with the fluid provides an optimum location for uniform heat transfer between the diodes and the temperature sensitive medium. This action combined with a minimum temperature differential between the individual elements or portions of the apparatus to be stabilized contributes to high stability and well defined operation of the stabilized apparatus.

It has been found that the accuracy of a group of diodes temperature stabilized in accordance with the principles of this invention is maintained at better than a one percent error through a range of temperature from minus 30 degrees to plus 70 degrees centigrade. For such a temperature range, it has been found that the temperature change of the entire diode unit is plus or minus 0.5 degrees centigrade.

Although the invention has been described and illustrated in detail, it is to be clearly understood that the same is by way of illustration and example only and is not to be taken by way of limitation, the spirit and scope of this invention being limited only by the terms of the appended claim.

We claim:

A temperature stabilized system comprising an expansible inner chamber including top and bottom wall portions, said chamber confining therein a fluid expansible with increase in temperature, an upstanding support in said chamber fixed to one of said wall portions, a semi-conductor device to be stabilized secured to said support and having the entire external peripheral surface thereof in intimate contact with said fluid, an outer chamber surrounding said inner chamber, means for uniformly applying heat to the exterior of said inner chamber, said means comprising a viscous heat conductive liquid in said outer chamber in contact with said inner chamber and a heating element immersed in said liquid, and means for de-energizing and energizing said element in response to expansion and contraction respectively of said inner chamber.

References Cited in the file of this patent
UNITED STATES PATENTS

| | | |
|---|---|---|
| 1,874,909 | Conklin | Aug. 30, 1932 |
| 1,874,980 | Hansell | Aug. 30, 1932 |
| 1,999,473 | Osnos | Apr. 30, 1935 |
| 2,524,886 | Colander et al. | Oct. 10, 1950 |
| 2,676,274 | Kobayashi | Apr. 20, 1954 |